ELLSWORTH D. IVES.
Improvement in Hubs for Wheels of Vehicles.

No. 118,369.  Patented Aug. 22, 1871.

Witnesses
E. Schaeffer Metzger
Henry Koogman

Inventor
Ellsworth D. Ives

UNITED STATES PATENT OFFICE.

ELLSWORTH D. IVES, OF PHILADELPHIA, PENNSYLVANIA.

IMPROVEMENT IN HUBS FOR WHEELS OF VEHICLES.

Specification forming part of Letters Patent No. 118,369, dated August 22, 1871.

*To all whom it may concern:*

Be it known that I, ELLSWORTH D. IVES, of Philadelphia, Pennsylvania, have invented certain new and useful Improvements in Wagon-Hubs, of which the following is a specification:

The nature of my invention consists in making a light hollow metallic hub, composed of but two parts, and in which the ends of the spokes are held in place by being compressed between these parts, without the use of bolts or screws; also, in the use of a piece of rubber placed around that part of the box against which the ends of the spokes bear, so as to receive and deaden the concussion.

Figure 1:
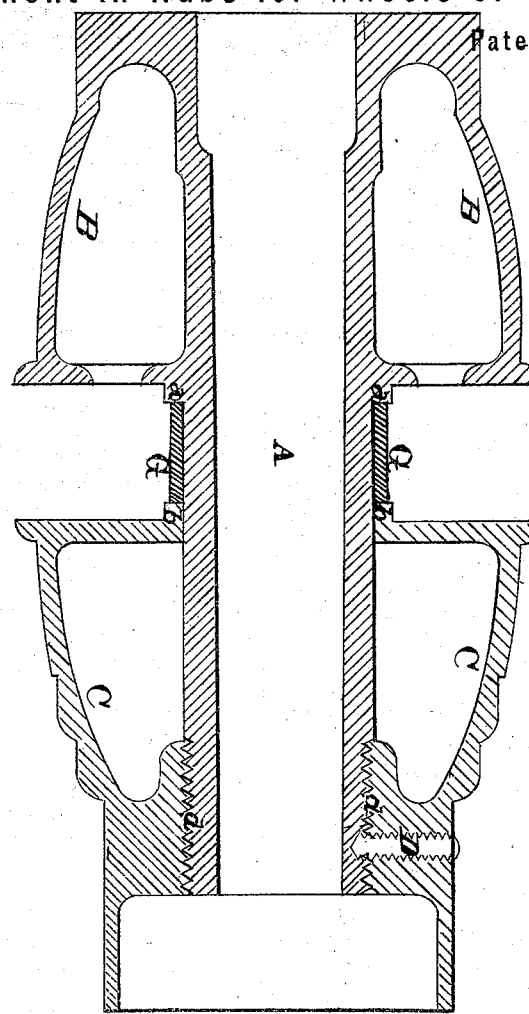
Figure 2:
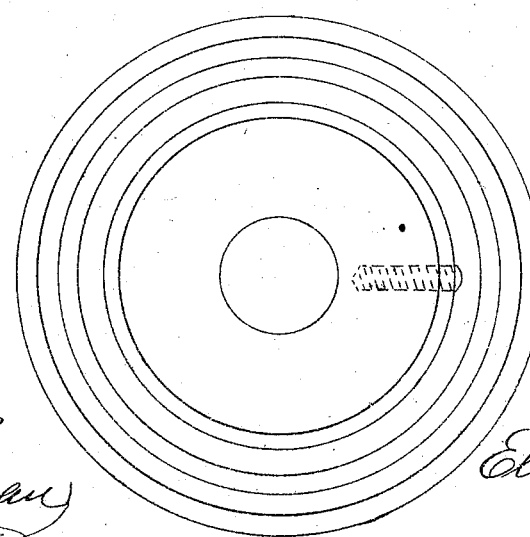

In the accompanying drawing, Figure 1 represents a section view of my hub, and Fig. 2 an end view of the same.

A represents the box, having one-half of the hub B cast with and upon it, so as to form but a single piece. C is the second part of the hub, cast hollow like the part B, so as to be as light as possible, and which has a female screw cut around its inner surface at $d$, so as to engage with the male thread upon the end of the box, whereby it can be screwed up with any desired pressure against the ends of the spokes, so as to hold them firmly in place. D is a set-screw, passing through the part C into the box, so as to prevent the part C from ever accidentally becoming unscrewed or loose. In between the two parts of the hub are two flanges or projections, $a\ b$, which form a socket for the ends of the spokes, whereby they are held more firmly and securely in place than in a plain clamp. Around the box is placed a band of rubber or other elastic material, G, against which the ends of the spokes bear, so that all jar or concussion upon the wheel is eased or deadened, and thereby prevented from affecting the vehicle.

A hub constructed in this manner of two hollow parts is not only lighter and cheaper than the metallic hubs now in use, but is just as serviceable and will last as long, besides being neater in appearance.

Having thus described my invention, what I claim as new, and desire to secure by Letters Patent, is—

The box A having the part B cast with it, in combination with the part C held in place by a set-screw, D, the socket $a\ b$, and rubber band G, when all are combined as set forth to form a metallic hub.

E. D. IVES.

Witnesses:
E. SCHAEFFER MELZGER,
HENRY KROGMAN.